(12) United States Patent
Challapali et al.

(10) Patent No.: US 8,451,751 B2
(45) Date of Patent: May 28, 2013

(54) CHANNEL MANAGEMENT METHOD IN A DISTRIBUTED SPECTRUM COGNITIVE RADIO NETWORK

(75) Inventors: Kiran S. Challapali, New City, NY (US); Jianfeng Wang, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 410 days.

(21) Appl. No.: 12/746,261

(22) PCT Filed: Dec. 5, 2008

(86) PCT No.: PCT/IB2008/055126
§ 371 (c)(1),
(2), (4) Date: Jun. 4, 2010

(87) PCT Pub. No.: WO2009/072087
PCT Pub. Date: Jun. 11, 2009

(65) Prior Publication Data
US 2010/0271948 A1    Oct. 28, 2010

Related U.S. Application Data

(60) Provisional application No. 60/992,814, filed on Dec. 6, 2007.

(51) Int. Cl.
*H04L 12/28* (2006.01)
*H04W 4/00* (2009.01)
*H04B 7/216* (2006.01)

(52) U.S. Cl.
USPC ........... 370/254; 370/329; 370/335; 370/342; 455/434

(58) Field of Classification Search
None
See application file for complete search history.

(56) References Cited

U.S. PATENT DOCUMENTS

| 7,110,374 | B2 | 9/2006 | Malhotra | |
|---|---|---|---|---|
| 7,224,697 | B2 | 5/2007 | Banerjea | |
| 2004/0033789 | A1 | 2/2004 | Tsien | |
| 2007/0249341 | A1* | 10/2007 | Chu et al. | 455/434 |
| 2008/0130519 | A1* | 6/2008 | Bahl et al. | 370/254 |
| 2008/0171552 | A1 | 7/2008 | Hyon | |
| 2009/0067354 | A1* | 3/2009 | Gao et al. | 370/310 |
| 2010/0135226 | A1* | 6/2010 | Chandramouli et al. | 370/329 |

FOREIGN PATENT DOCUMENTS

WO    WO2007031961 A2    3/2007

* cited by examiner

*Primary Examiner* — Melanie Jagannathan
(74) *Attorney, Agent, or Firm* — Larry Liberchuk

(57) ABSTRACT

A source-assisted channel management method in a distributed spectrum cognitive radio wireless network handling a source of multimedia stream data handles a plurality of communicating devices (1, 2, 3) forming a group, and manages channels with no separate controller that is referenced in applicable IEEE standard. The source makes the reservation on behalf of the device group knows traffic schedule, and determines out-of-band channel scanning, back up channel and channel vacation. The method uses a flexible MAC superframe structure and proactively scans for back-up channels which could be used in lieu of the current channel, identifies devices in the group which should vacate a current channel when any one device from the group of communicating devices (1, 2, 3) detects an incumbent, and make a determination as to when the wireless network should vacate the current channel based on said traffic schedule. The method ensures that no interference is caused to existing users and maintains QoS.

14 Claims, 5 Drawing Sheets

Fast resume of transmission for a master-coordinated network

FIG. 1

An illustration of a
master-coordinated network

FIG. 2
Fast resume of transmission for a master-coordinated network

FIG. 3

An illustration of a
distributed coordinated network

FIG. 4

Fast resume of transmission for a distributed coordinated network

FIG. 5
New MAC Structure

CHANNEL MANAGEMENT METHOD IN A DISTRIBUTED SPECTRUM COGNITIVE RADIO NETWORK

A claim of priority under 35 USC §119(e) is made to U.S. Provisional Patent Application No. 60/992,814, filed on Dec. 6, 2007.

This invention generally relates to channel management in a radio network, and more particularly to channel management in a cognitive radio based wireless network without assistance from a central controller.

The present invention can be understood in light of the background of IEEE 802.22 network standard. A brief discussion of IEEE 802.22 and related peripherals is believed to be conducive to an understanding of the contribution of the present invention.

As known, IEEE 802.22 is a working group of IEEE 802 LAN/MAN standards committee which aims at constructing Wireless Regional Area Network (WRAN) utilizing white spaces (channels that are not already used) in the allocated TV frequency spectrum. The use of the spectrum will be managed in an opportunistic way in order not interfere with any TV channel that may be transmitting.

The IEEE 802.22 working group on Wireless Regional Area Networks is evolving as working group of the IEEE 802 LAN/MAN standards committee. Its project, formally called as *Standard for Wireless Regional Area Networks (WRAN)-Specific requirements-Part 22: Cognitive Wireless RAN Medium Access Control (MAC) and Physical Layer (PHY) Specifications: Policies and procedures for operation in the TV Bands*, focuses on constructing a consistent, national fixed point-to-multipoint WRAN that will utilize UHF/VHF TV bands between 54 and 862 MHz. Specific TV channels as well as the guard bands of these channels are planned to be used for communication in IEEE 802.22.

Because the IEEE 802.22 working group was formed in 2004, efforts are being made to specify regarding the particular functionalities of the PHY/MAC layers. However, the IEEE together with the FCC appears to be pursuing a centralized approach for available spectrum discovery. Specifically, each Access Point (AP) would be armed with a GPS receiver which would allow its position to be reported. This information would be sent back to centralized servers (in the USA these would be managed by the FCC), which would respond with the information about available free TV channels and guard bands in the area of the AP. Other proposals would allow local spectrum sensing only, where the AP would decide by itself which channels are available for communication. A combination of these two approaches is also envisioned in WRAN Topology.

IEEE 802.22 standard specifies that the network should operate in a point to multipoint basis (P2MP). The system will be formed by base stations (BS) and customer-premises equipment (CPE, above mentioned as Access Points or APs). The CPEs will be attached to a BS via a wireless link in the frequencies mentioned above. The BSs will control the medium access for all the CPEs attached to it. One key feature of the WRAN Base Stations is that they will be capable of performing a distributed sensing. This implies that the CPEs will be sensing the spectrum and will be sending periodic reports to the BS informing it about what they sense. The BS, with the information gathered, will evaluate whether a change is necessary in the channel utilized, or on the contrary, if it should stay transmitting and receiving in the same one. In other words, in IEEE 802.22, the BS acts as a central controller and takes the responsibility for channel management.

An Approach to the PHY Layer:

The goal of this layer is to provide excellent, yet simple, performance. The PHY layer must be able to adapt to different conditions and also needs to be flexible for jumping from channel to channel without errors in transmission or losing clients (CPEs). This flexibility is also required for being able to dynamically adjust the bandwidth, modulation and coding schemes. OFDMA will be the modulation scheme for transmission in up and downlinks. With OFDMA it will be possible to achieve this fast adaptation needed for the BSs and CPEs. By using just one TV channel (a TV channel has a bandwidth of 6 MHz; in some countries they can be of 7 or 8 MHz) the approximate maximum bit rate is 19 Mbit/s at a 30 km distance. The speed and distance achieved is not enough to fulfill the requirements of the standard. The feature Channel Bonding deals with this problem. Channel Bonding consists in utilizing more than one channel for Tx/Rx. This allows the system to have a bigger bandwidth which will be reflected in better system performance.

An Approach to the MAC Layer:

This layer will be based in Cognitive Radio Technology. It needs to be also able to adapt dynamically to changes in the environment by sensing the spectrum. The MAC layer will consist of two structures: Frame and Superframe. A superframe will be formed by many frames. The superframe will have a SCH (Superframe Control Header) and a preamble. These will be sent by the BS in every channel that it's possible to transmit and not cause interference. When a CPE is turned on, it will sense the spectrum, find out which channels are available and will receive all the needed information to attach to the BS. Two different types of spectrum measurement will be done by the CPE: in-band and out-of-band. The in-band measurement consists in sensing the actual channel that is being used by the BS and CPE. The out-of-band measurement will consist in sensing the rest of the channels. The MAC layer will perform two different types of sensing in either in-band or out-of-band measurements: fast sensing and fine sensing. Fast sensing will consist in sensing at speeds of less than 1 ms per channel. This sensing is performed by the CPE and the BS and the BS's will gather all the information and will decide if there is something new to be done. The fine sensing takes more time (approximately 0.25 ms per channel or more) and it is utilized based on the outcome of the previous fast sensing mechanism. These sensing mechanisms are primarily used to identify if is there is an incumbent transmitting, and if there is a need to avoid interfering with it.

With the recent NPRM (Notice of Proposed Rule Making) of the FCC for allowing the unlicensed use of television bands, there has been growing interest in enabling new real-time applications. The FCC is considering two classes of devices: fixed/access and personal/portable. Fixed/access type of devices tend to be high powered and hence offer long range, also requiring centralized network protocol architectures, such as the architectures recommended in IEEE 802.22. However, the personal/portable type of device is more similar to existing WiFi in range. Unlike in WiFi, personal/portable devices will likely be used for the distribution of multimedia content within the home, thus requiring a peer-to-peer architecture.

In order to use television band (which is attractive from the point of view of propagation characteristics and providing additional spectrum) CRs must first be able to detect the presence of incumbent users reliably, robustly and quickly. First of all, existing WiFi networks are not cognitive; second, IEEE 802.22 networks are centralized, where all channel management functions are handled by the central controller.

There is a need for these functions in distributed protocol architecture.

Spectrum agile/cognitive radio technology is much needed to opportunistically utilize an available channel. One core design in a spectrum-agility/cognitive-radio network is channel switch. How fast a device can finish channel switch and resume transmission plays a key role in Quality-of-Service (QoS) provisioning.

As a normal procedure, a device needs to redo network entry and initialization after channel switch, which include but not limited to the flowing procedures, channel scan and device discovery, network association and authentication, device capability negation, channel reservation, session setup. Every procedure may take significant time. Particularly, channel scan and device discovery takes up to minutes.

In IEEE 802.22, a list of backup channels is pre-selected to avoid time-consuming channel scan.

However, even with a selected backup channel, the total time for resuming transmission could be still unacceptable, especially for delay-sensitive applications like high quality AV. The total network reset time could be non-linearly increased with the number of network devices acting on channel switch. Part of the reason is that some procedures need to use contention based approach to resolve multi-user collisions. For example, network entry signaling is contention based in 802.22 and WiMedia. Network association, for example, for more than ten users can take hundreds of milliseconds to seconds in 802.22 or WiMedia, given that a signaling window used for contention-based network entry is small and the interval between signaling windows are tens of milliseconds. This is undesirable and can be viewed as a channel sweep storm problem.

The present invention intends to provide a solution to the problem of channel management in a cognitive radio-based wireless network without a central controller (overcoming setbacks in the existing IEEE 802.22 solution which uses a central controller). In one form, in the IEEE 802.22 implementation, a base station acts as a central controller and takes the responsibility for channel management. The present invention in doing away with the use of the central controller, comprises the step of identifying a group of communicating devices, wherein the source of the multimedia stream might make a determination of when a wireless network should vacate a channel, which channel to go to (which is herein referred to as a backup channel), and when to proactively scan for backup channels, to ensure that no interference is caused to existing (incumbent) users. Simultaneously, it is ensured that the application served by the CR wireless network does not experience disruption (i.e. its QoS is maintained). To this end, expediently one form of the present invention is directed to channel management using a new MAC superframe structure and beaconing method.

Presented herein is a fast channel switch method given that a clean backup channel is available and network devices are synchronized. The first feature of the approach herein is that devices are coordinated to switch from an old channel and are synchronized to resume transmission in the new channel. The second element of the approach herein is that same settings/states/rules used in the old channel are preserved in the new channel to avoid time-consuming reestablishing process. As a result, the channel-switch-time can be significantly reduced. The approach described herein applies to both centralized networks and distributed networks.

Described hereinafter is a scheme to facilitate fast channel switch based on the assumption that a clean backup channel is available. Assume superframe based mechanism is used for medium access control (or spectrum access control). Superframe is of fixed-length (in time domain) and periodic. All devices in the network are synchronized, in the distributed or centralized way, with a network coordinator. A network coordinator could be a base station in 802.22, a PAN coordinator in Zigbee/802.15.4, a master device in Bluetooth/802.15.1, a beaconing device in WiMedia, or a source of a stream. In distributed beaconing network, multiple beaconing devices (coordinators) exist but each beaconing device occupies one dedicated beacon slot at the beginning of superframe. A network coordinator normally sends frame control or beaconing at the beginning of a superframe, for synchronization as well as the specification of superframe structure. The superframe structure specifies the beginning and the end of superframe, and the usage of the rest of superframe in the units of time block, e.g., who is the reservation owner of certain time block.

The first element of the present approach is coordinate-to-switch. Every network device should be aware when the new superframe resumes in the new channel before switching to new channel. To do so, a network coordinator should send other devices a coordinate-to-switch message (maybe multiple times for increasing reliability) including the target Time-to Resume-Superframe (TRS) in the new channel. The duration of the time to resume transmission in new channel depends on applications and co-existence requirement (e.g., regulatory requirement) but generally should be long enough to allow channel switch time in the sense of hardware requirement as well as other overhead. For example, in cognitive network, it may be required to do channel sensing before using new channel. After channel switch, when the target time to resume superframe is approaching, the network coordinator resumes transmission of frame control/beacon.

The second element in the present approach is channel-imaging after channel-switch. Channel-imaging means every device in the network should keep the same PHY/MAC settings as set in the old channel to the maximum extent, thus avoiding/reducing time to re-settle channel reservation as well as other resolution (like address resolution), negotiation (like device capability) and authentication procedures.

Not every device in the network may receive coordinate-to-switch messages. Those devices which do not receive a coordinate-to-switch message but realize to move finally should perform channel scan in the new channel for certain long duration. This channel scan allows those devices losing synchronization to discover other network devices and be synchronized again. In a distributed beaconing network, a beaconing device losing synchronization may scan the new channel for at least a certain duration, which may be adjusted as a function of the beaconing order in the old channel.

The invention in one form resides in a source assisted channel management method in a distributed spectrum cognitive radio wireless network handling a source of multimedia stream data using a current channel and having a plurality of communicating devices that form a group, the method comprising the steps of: configuring said source of multimedia stream to track traffic schedule of the data; proactively scanning for back-up channels which could be used in lieu of the current channel; identifying certain communicating devices in the network which should vacate a current channel when any one device from the group of communicating devices detects an incumbent, and make a determination as to when the wireless network should vacate the current channel based on said traffic schedule; and, ensuring that no interference is caused to existing users and QoS is maintained.

The invention in a second form resides in a source assisted channel management method in a distributed spectrum cognitive radio wireless network handling a source of multimedia stream data using a current channel and having a plurality of communicating devices forming a group, without using a separate controller that is referenced in applicable IEEE standard, the method comprising the steps of: configuring the source of multimedia stream to track traffic schedule of the data; proactively scanning for back-up channels which could be used in lieu of the current channel; identifying certain communicating devices in the network which should vacate a current channel when any one device from the group of communicating devices detects an incumbent and make a determination as to when the wireless network should vacate the current channel based on said traffic schedule; and, ensuring that no interference is caused to existing users and QoS is maintained.

The invention in another form resides in a channel management method in a distributed spectrum cognitive radio wireless network handling a source of multimedia stream data using a current channel and having a plurality of communicating devices forming a group, without using a separate controller that is referenced in applicable IEEE standard, the method comprising the steps of: configuring said source of multimedia stream to track traffic schedule of said data; proactively scanning for back-up channels which could be used in lieu of the current channel; identifying certain communicating devices in the network which should vacate a current channel when any one device from the group of communicating devices detects an incumbent, and make a determination as to when the wireless network should vacate the current channel based on said traffic schedule; ensuring that no interference is caused to existing users and QoS is maintained; the method using a signaling window for exchanging network entry messages and channel reservation requests; the method including the step of synchronizing the devices to resume transmission in a selected back-up channel after channel switch, retaining for the selected back-up channel unchanged settings/states as used in said current channel.

Expediently, the exemplary methods recited above can be implemented by using a flexible MAC superframe structure. More features of the present approach will be described in the following passages.

A more detailed understanding of the invention may be had from the following description of preferred embodiments, given by way of example and to be understood in conjunction with the accompanying drawing wherein.

A detailed description of one or more embodiments of the invention is provided below in the context of the accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

New MAC Superframe Structure and Beaconing Method:

In distributed wireless protocol architecture, a plurality of devices may be operating on a channel, sharing the resources. On the one hand, the FCC's existing proposed rules require that if a first device detects the presence of an incumbent, the first device must vacate the channel within a few seconds. On the other hand, since incumbents need to be detected at very low signal-to-noise levels, sensing algorithms have high probability of detection and low (but non zero) probability of false alarm. One easy and obvious solution may be that if any one device detects an incumbent, all the devices vacate the channel. However, this is not a desirable solution owing to false alarms, since wireless networks may needlessly keep changing channels. The present approach defines a group of communicating devices, and only the devices in the defined group vacate the channel when one of the devices from the group detects an incumbent. The communicating group of devices is either a pair of source and destination, or a multicast/broadcast group.

Within the communicating group of devices, there is one source for multimedia content. This source device acts as the controller (situationally) for the group of communicating devices. It is aware of the busy schedules (transmission, reception and sensing times) of all the devices in the communicating group. It can request devices within the group to visit other channels when not busy, in order to be aware of what is going on in other channels, and to proactively select backup channels for the communication group, should communication be disrupted in the current channel.

Given the communication group and given the source which proactively determines back up channels, when one of the devices in the group detects an incumbent it reports to all the devices in the group, including the source. It announces that it will vacate the channel within a few superframes. The source then queues up the stream so that no disruption is caused, and resumes after channel switch. In our prototype we see an additional delay jitter of one superframe due to channel change (of the order of 100 msec), whereas no packets are lost. Other devices in the channel can make an independent decision whether to vacate or not, depending upon whether or not devices within that group detect an incumbent.

Expediently, the present approach uses a new MAC superframe structure and beaconing method to achieve the channel management.

Figure 1:
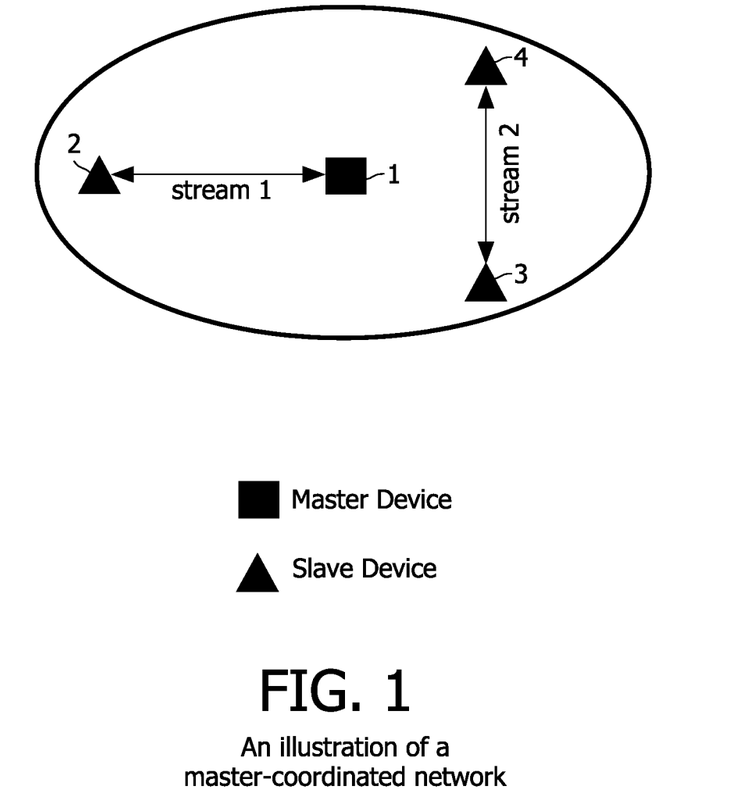
FIG. 1 is an illustration of a master coordinated network in the context of the invention.
Figure 2:
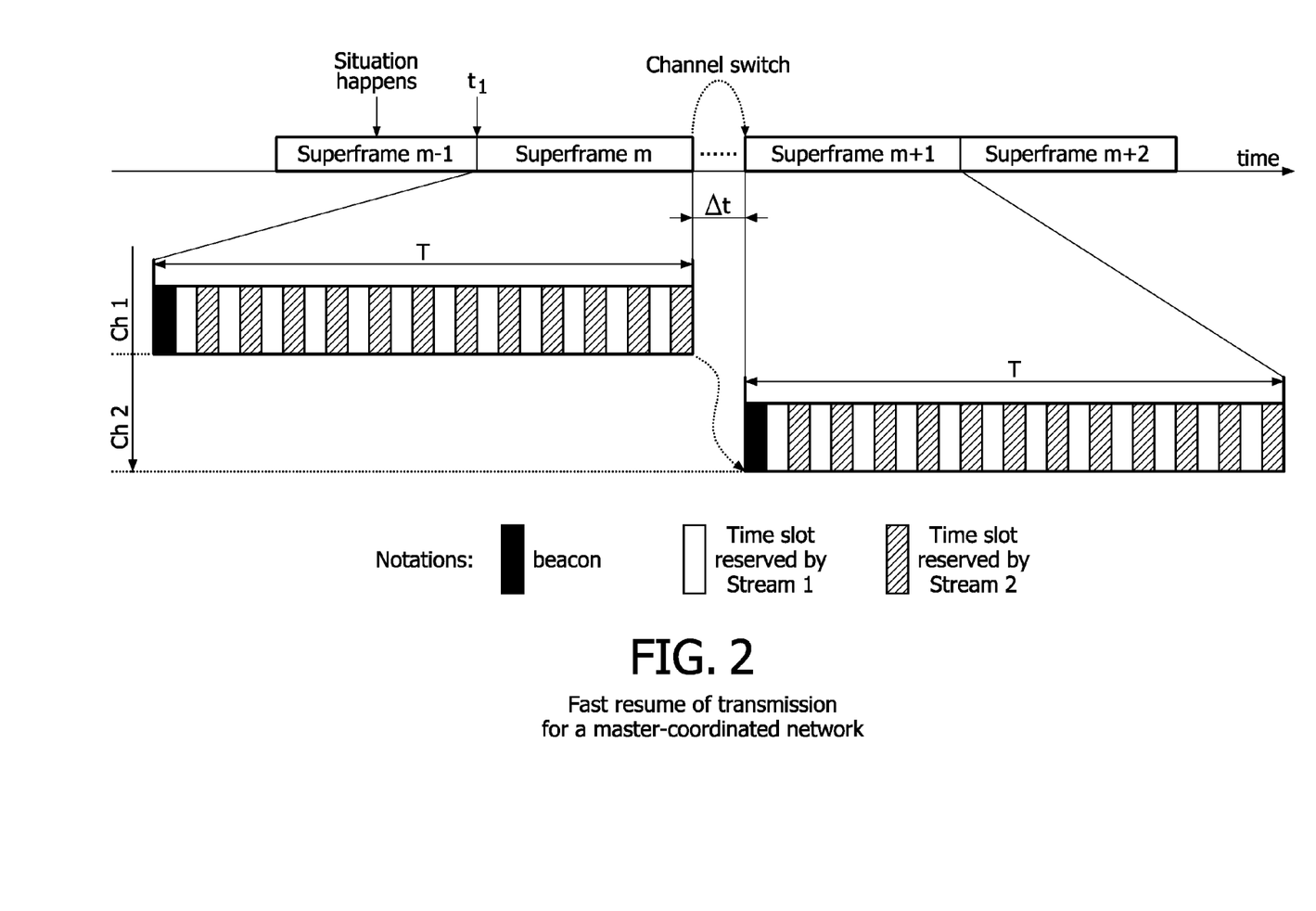
FIG. 2 illustrates an exemplary fast resume of translation for a master coordinated network in the context of the invention.

FIG. 1 exemplifies a network coordinated by a Master device. The Master device sends a beacon at the beginning of each superframe and announces the channel allocation of each slot. Two streams in the network share time slots in an interleaving way according to the allocation. A situation is observed, for example, during superframe m−1, as shown in FIG. 2. The master then broadcasts the coordination-to-switch message in its beacon at the beginning of superframe m. The coordination-to-switch message includes the time to start channel switch (at time $t_1+T$) and the Time-to-Resume-Superframe which equals $t_1+T+\Delta t$. Once channel switch starts, packets at the sources will be held and buffered. Once new superframe in new channel resumes, the transmission resumes following the same rules set in the old channel. Since coordination is enabled, Δt could be very short. As a result, QoS (e.g., packet loss, delay, and throughput) will not be hurt due to channel switch.

Figure 3:
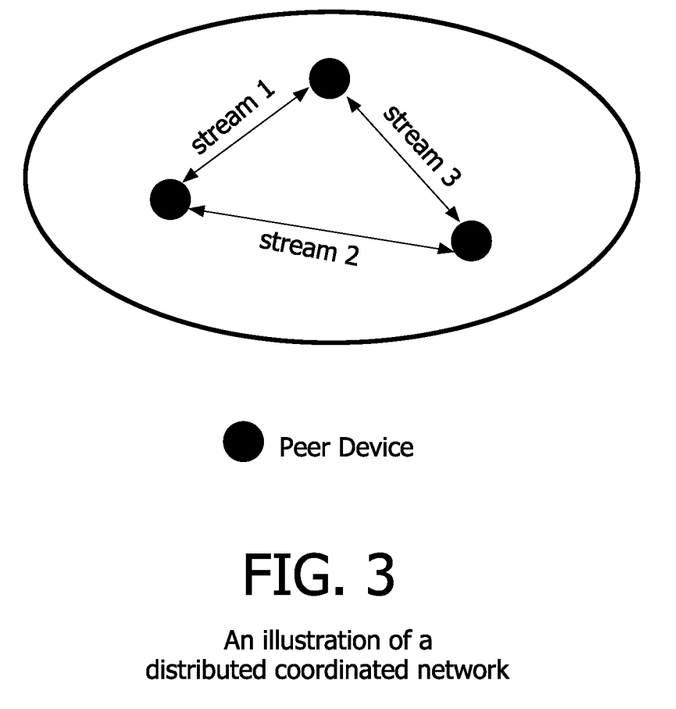
FIG. 3 is an illustration of an exemplary distributed coordinated network in the context of the invention.
Figure 4:
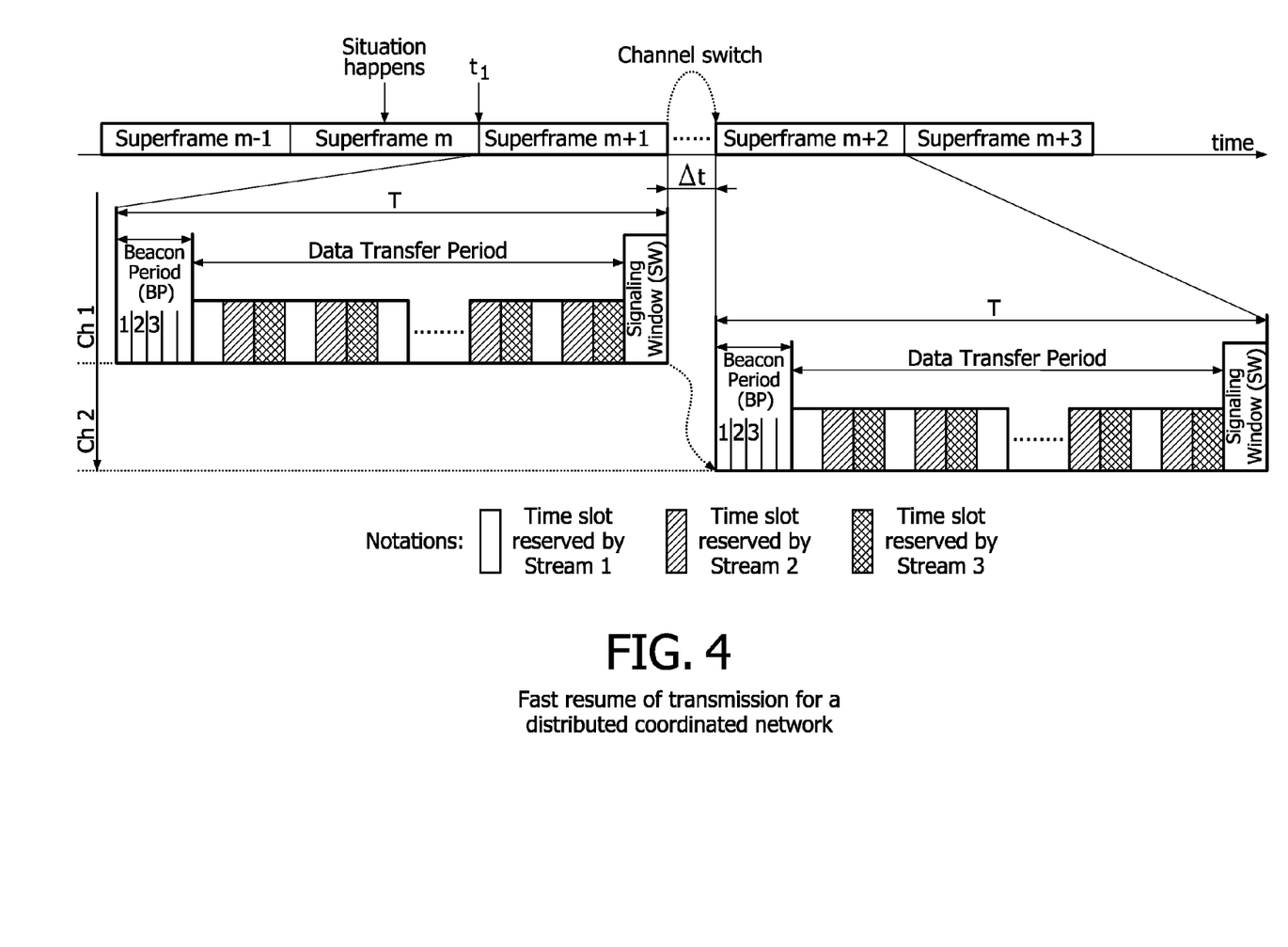
FIG. 4 illustrates an exemplary fast resume of transmission for a distributed coordinated network in the context of the invention; and, FIG. 5 an exemplary new MAC structure in the context of the invention.

FIG. 3 exemplifies a distributed coordinated network. Every device does beaconing in a dedicated beacon slot during beacon period, as shown in FIG. 4. Each beacon includes the specification of superframe the device observes. During data transfer period, device follows the distributed reservation rule to transmit and receive data. A situation is observed, for example, during superframe m. Every device observing the situation should include a coordination-to-switch information element in its beacon at the beginning of superframe m+1. The coordination-to-switch information element includes the time to start channel switch (at time $t_1+T$) and the Time-to-Resume-Superframe which equals $t_1+T+\Delta t$. Once channel switch starts, packets at the sources will be held and buffered. Once new superframe in new channel resumes, the transmission resumes following the same rules set in the old channel. Similar as master-coordinated network, Δt could be very short and no significant packet loss or delay will be caused due to channel switch.

Definition of subnet and Device type in the context of the present invention: In this invention, a Subnet is defined as a collection (or group) of devices which are under the management of one entity (e.g., network administrator) and share a common MAC protocol. If the medium access in the subnet is controlled by a single device, a subnet is defined as a Centralized Subnet. On the other hand, if the medium access in the subnet is coordinated in the distributed manner, a subnet as a Distributed Subnet. A device in a distributed subnet is called a Peer Device; the subnet coordinator in a centralized subnet is called a Master Device; and, a device other than subnet coordinator in the centralized subnet is called a Slave Device. At any given time, a device can only operate as one of the three types, i.e., a device can either be a Master, Slave or Peer device. Also, two subnets as are referred to Neighboring Subnets if the two subnets share the same channel and at least one active device from the first subnet is in the transmission range of the second subnet. FIG. 4 shows an illustration of fast resume of transmission for a distributed coordinated network.

Figure 5:
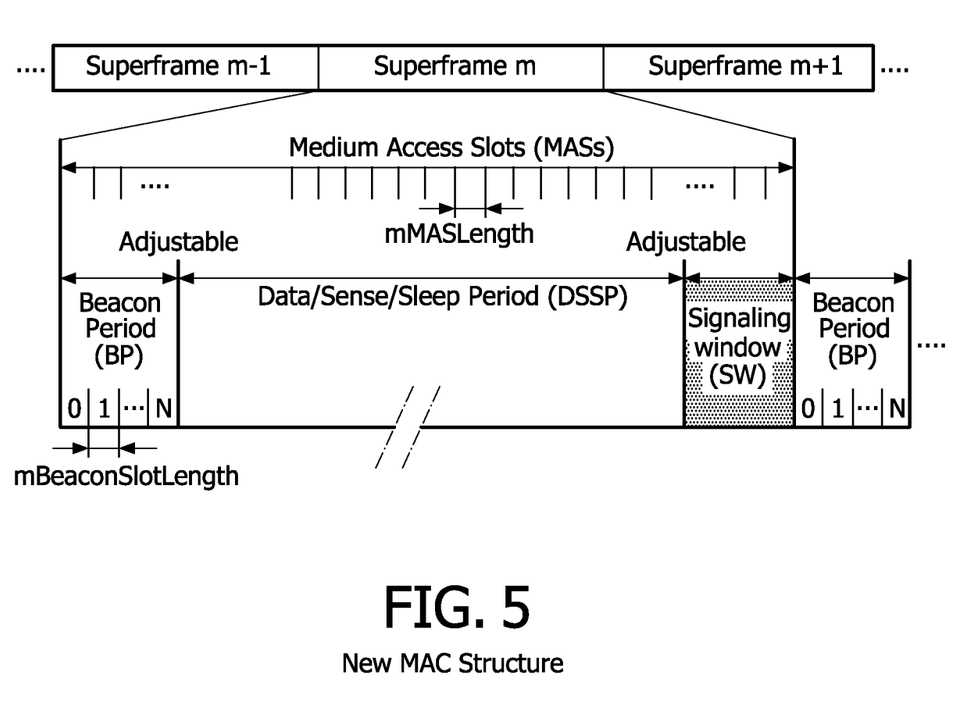

A Flexible MAC (Flex-MAC) Superframe Structure:

As illustrated in FIG. 5, the proposed MAC protocol follows a recurring Superframe structure, which consists of a beacon period (BP), data/sense/sleep period (DSSP) and a signaling window (SW). The signaling window and beacon period are used for broadcasting/exchanging control/management information and their sizes (in time slots) are dynamically adjustable.

All devices in the connected subnets which share the same channel shall follow the same Superframe structure. Superframe merging is necessary if two subnets, which follow different Superframe structures and share the same channel, become neighbors.

All the devices should keep awake during the beacon period and signaling window in order to capture all the control/management information which may be relevant to every device. A device may exchange data, monitor one or more channels (needed in cognitive networks), or go into sleep mode during Data/Sense/Sleep period.

For purposes of this invention, a device is treated as a beaconing device if it owns a beacon slot in a beacon period BP and regularly transmits beacons. Different from WiMedia, not every device is required to be a beaconing device, which allows the flexibility and scalability. Whether a device should become a beaconing device for purposes of this invention will depend on the following considerations:

a) A peer device should be a beaconing device.

b) A master device must be a beaconing device. In other words, a master device must own one dedicated beacon slot in the beacon period. There could be multiple master devices in the same network, each of which controls a group of slave devices. In such case, each master device shall own one beacon slot in the beacon period.

c) A slave device is normally a non-beaconing device, which does not own a beacon slot in the beacon period. But in certain scenarios, a slave device could be a beaconing device, e.g., to enable co-existence and reduce a hidden terminal problem.

The considerations above can be used to help establish a beaconing backbone across the connected subnets. With the beaconing backbone and the dedicated use of beacon slots, those devices in a coordination role or in real-time and intensive transmission can easily guarantee control information (including bandwidth reservation information) reliably and timely delivered, thus improving QoS support and system reliability.

One significant component in the proposed MAC is the synchronization. To synchronize the devices, all the devices in the connected subnets should follow the same BPST (Beacon Period Start Time) and the same superframe number. The BP starting time and superframe number are initiated by the first device establishing the beacon period, which could be a master device or a peer device. The merging of BPST and superframe structure is necessary if two disconnected subnets become connected.

Beacon Period (BP) Operation:

The channel access method for beacon period is reservation based, specifically TDMA based. Beacon period is divided into multiple equal beacon slots, numbered from zero and increased one by one. The starting time of the Superframe is equivalent to the starting time of the first beacon slot. Each beaconing device owns one beacon slot, sends a beacon in its own beacon slot and listens to other beacon slots. This is similar as WiMedia.

A new beaconing device should preferably select the smallest available beacon slot in the BP as its own beacon slot. For example, if a device is the very first device which initiates BP, it should choose beacon slot zero as its own beacon slot number. A beaconing device should regularly send a beacon in its own beacon slot.

A beaconing device as described herein, expediently uses the beacon to advertise its own superframe number, device type (illustrated in Table 1), subnet ID (which could be a name string, e.g., configured by subnet owner), the SW length, in addition to what is defined in WiMedia standard for example, Beacon Period Occupancy IE (BPOIE, which includes BP length), DRP Availability IE, PCA Availability IE, Traffic Indication Map (TIM) IE, Identification IE. By the above information indicated in beacon, every device in the network knows the Superframe structure and channel reservation status. An exemplary format of the beacon is illustrated in Table 3.

TABLE 1

Illustration of Device Type Encoding

| Value | Device type |
|-------|-------------|
| 0 | Master Device |
| 1 | Peer Device |
| 2 | Slave Device |

TABLE 2

Illustration of Subnet ID format

| Syntax | Size |
|---|---|
| Subnet_ID_Format( ) { | |
| Length (=N) | 1 byte |
| Name String | N byte |

TABLE 3

Illustration of Beacon Frame Payload Format

| Syntax | Size | Notes |
|---|---|---|
| Beacon_Frame_Payload_Format() | | |
| Device Identifier | 6 bytes | Defined through EUI-48 |
| Superframe Number | 2 bytes | The device first establishing beacon period will initialize the superframe number. The superframe number increments once per superframe, following a modulo counter. |
| SW length | 1 byte | In terms of the number of MASs |
| Device Type | 1 byte | Defined in Table 1 |
| Subnet ID | Variable | Defined in Table 2 |
| For(i = 1, i <= N, i++){ | | |
| IE$_i$ | variable | Information element. |

Beacon period length is adjustable between minimum BP length (BP$_{min}$, e.g. one beacon slot) and maximal BP length (BP$_{max}$). Upon establishing the beacon period, the BP length is of the minimum length by default. When a new beaconing device requests to join the BP, the beacon period may be extended. When a beaconing device leaves the network, the beacon period may be downsized and the beacon slots may be shifted to lower numbered slots.

The procedures to extend or shrink the BP, as well as shifting beacon slots are not dwelt upon in further detail herein. But the general requirement for BP extension is to ensure that each beaconing device be aware of the BP adjustment request and confirm such adjustment request. For example, every beaconing device should confirm/update/advertise such BP adjustment in its beacon.

Network entry as aforesaid, is an essential component in the network protocol design. Current network entry schemes normally support either distributed mode or centralized mode, but not flexible operation. Therefore, a new network entry scheme must be designed to exploit the flexibility of Flex-MAC.

A network entry process for flexible wireless system, which may operate in the centralized mode or the distributed mode, is discussed in the following. Major components are listed as follows.

1) Device discovery: effective mechanisms provided to assist device discovery.
2) BP establishing/joining process.
3) Master-Slave association: flexibility is enabled in that no network entry sequence order is required. If a slave device enters the network after the master device, association can be initiated by the slave device. If the master device enters the network after a slave device, association can be done via the invitation of the Master device to avoid contention overhead.

An exemplary flexible MAC structure is illustrated in FIG. 5, which includes a beacon period, a DSSP (Data/Sense/Sleep Period) section, and a signaling window SW. For the convenience of presentation, a specific device is functionally treated as a home device relative to the other devices if the devices belong to the same group and share the same group or network identifier (e.g. Subnet ID). The device types (including peer device, master device and slave device) are discussed herein before. A slave device is defined under the context of master device. If there is no master device, a device is by default treated as a peer device. A peer device can become a slave device if it finds a home master device.

In the following sections, each network entry component is detailed as an example.

Overview of Network Entry Procedures:

A master device or a peer device should do beaconing regularly after joining a network. To assist device discovery, beacons advertise subnet ID, device name and device type, among others. For a master device, the beacon may also include the list of slave devices.

When a new device powers up, it performs the following network entry procedures:

1) Scan for beacons to perform device discovery.
2) If no beacons received after certain observation period, the device should establish a BP as described in the following passages.
3) If a home device is found and the home device is the master device, the new device should register itself with the home master device and become a slave device.
4) In other cases, the new device may join the existing beacon period. Moreover, if the new device is a master device and it finds other home devices in the network, it may go further to request other home devices to become slave devices, as defined below.

BP Establishing Process:

A new device should establish a BP if no beaconing device is found. An exemplary procedure to establish a new BP is as follows. The new device chooses a BP starting time, takes the beacon slot zero as its own beacon slot and sends a beacon regularly after that. The first beacon announces the initial Superframe number, BP length and SW length, among other parameters. The device should also announce its device type. For instance, if the new device is a master device, it should set the device type as master device; otherwise the new device sets the device type as a peer device.

BP Joining Process:

A new device that is searching for a master device may join a BP if it does not find any home master device among the beaconing devices. The procedure to join an existing BP is described as follows. The new device should scan at least one Superframe before sending messages to request joining the BP. The information gathered during scan, such as BP occupation and channel reservation, may help the new device to judge whether to join the BP. This is very useful in multi-channel environments where dynamic frequency selection is needed.

If the new device decides to join a BP, it should broadcast BP_JOIN_REQ message in the Signaling Window (vide FIG. 1) to request joining the BP. The BP_JOIN_REQ indicates the beacon slot the new device intends to use. Since transmissions during the SW are contention-based, the BP_JOIN_REQ may collide with other messages. To increase reliability, the new device can also choose a beaconing device as a point-of-contact to acknowledge the BP_JOIN_REQ. The point-of-contact device should acknowledge immediately, i.e., SIFS (short inter-frame space) after successfully receiving the BP_JOIN_REQ and if no collision is detected. If no ACK is received after the SIFS interval after sending BP_JOIN_REQ, the new device may retransmit the BP_JOIN_REQ following a random backoff procedure.

A beaconing device receiving the BP_JOIN_REQ should confirm such request in the following BP by updating BPIOE in its beacon. The updated BPIOE indicates that the new device becomes the owner of the requested beacon slot. However, if a beaconing device observes the intended beacon slot has already been occupied by other device, the beaconing device may implicitly deny such request by indicating that the owner is different from the new device making the request. A beaconing device may suggest a new beacon slot for the new device if there is beacon slot open.

After establishing at least one confirmation/suggestion and no objection, a new beaconing device can start sending beacons in the following BP in the beacon slot confirmed by beaconing devices. Otherwise, the new device may try in the signaling window (FIG. 5) later.

Slave Initiated Master-Slave Association:

A new device should initiate Master-Slave association if it finds a home master device during network entry. The new device should send REG_REQ (association request message) to the home master device in a signaling window. The master device acknowledges immediately, i.e., within SIFS after receiving the REG_REQ. After processing the request, the master device confirms the request using REG_CFM message. REG_CFM may be sent in the signaling window using an explicit message or sent in beacon using implicit information element. According to the command of master indicated in REG_REQ, any necessary authentication procedure may follow the association confirmation. A slave device that has been associated with a Master device is normally not a beaconing device so that BP joining process as described below is not required. However, to assist co-existence, a slave device may be promoted by a master device to a beaconing device.

Master Invited Master-Slave Association:

A master device may join the network after some other home devices, which are presented as peer devices at the time when the master device joins. Those home devices are supposed to become slave devices after a master device appears. Therefore, the master device should invite those home devices one by one to perform association. The association invitation message REG_IND (registration indication) can be included in the beacon. According to the command of master indicated in REG_IND, any necessary authentication procedure between the slave device and the master device may follow REG_IND. After becoming a slave device, a home device which used to be a beaconing device normally changes to be a non-beaconing device to save beaconing overhead. A beacon slot will then be released after finishing the transition. However, to enable co-existence, a home device may still keep beaconing after transition to slave device.

The following features of one embodiment of the invention are noted: Source (that makes the reservation on behalf of a group of communicating devices) determines out-of-band channel scanning, back up channel and channel vacation, since it knows traffic schedule.

At least one unique advancement achieved by the invention is in the form of essential cognitive functions that are extended to distributed architectures.

The proposed method of channel management is intended to be proposed as an essential part of UCoMS standard.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" where present, are used as the plain-English equivalents of the respective terms "comprising" and "wherein," respectively. Moreover, the terms "first," "second," and "third," etc., if used are merely labels, and are not intended to impose numerical requirements on the associated objects.

The invention claimed is:

1. A source assisted channel management method in a distributed spectrum cognitive radio wireless network having a plurality of communicating devices forming a group, the method comprising:
configuring at least one source device of multimedia stream data using a current channel to track traffic schedule of said data;
proactively scanning for back-up channels which could be used in lieu of the current channel;
identifying certain communicating devices in the network which should vacate a current channel when any one device from the group of communicating devices detects an incumbent, and make a determination as to when the wireless network should vacate the current channel based on said traffic schedule; and,
wherein within the plurality of communicating devices, one device is configured to act as a controller for all remaining of the plurality of communicating devices;
wherein said one device is further configured to be aware of transmission, reception and sensing times of all the devices in the plurality of communicating devices;
wherein said one device is additionally configured to request devices within the group of devices to visit other channels when not busy to know any channel activity and to proactively select back up channels for the group of devices.

2. The source assisted channel management method as in claim 1 wherein said plurality of communicating devices is a pair of source and destination devices.

3. The source assisted channel management method as in claim 1 wherein said plurality of communicating devices is a multicast broadcast group of devices.

4. The source assisted channel management method as in claim 1 wherein when one of the devices in the group detects an incumbent device, the method comprises reporting to all of the devices in the group, including the one device that acts as the controller.

5. The source assisted channel management method as in claim 4 further comprising said one of the devices vacating the channel within a few superframes.

6. The source assisted channel management method as in claim 4 further comprising the source device queuing up said multimedia stream so that no disruption is caused.

7. The source assisted channel management method as in claim 5 wherein other devices in the channel can make an independent decision whether to vacate or not.

8. A source assisted channel management method in a distributed spectrum cognitive radio wireless network having a plurality of communicating devices forming a group, without using a separate controller that is referenced in IEEE 802.22 standard, the method comprising:
- configuring at least one source device of multimedia stream data using a current channel to track traffic schedule of said data;
- proactively scanning for back-up channels which could be used in lieu of the current channel;
- identifying certain communicating devices in the network which should vacate a current channel when any one device from the group of communicating devices detects an incumbent, and make a determination as to when the wireless network should vacate the current channel based on said traffic schedule; and,
- wherein within the plurality of communicating devices, one device is configured to act as a controller for all remaining of the plurality of communicating devices;
- wherein said one device is further configured to be aware of transmission, reception and sensing times of all the devices in the plurality of communicating devices;
- wherein said one device is additionally configured to request devices within the group of devices to visit other channels when not busy to know any channel activity and to proactively select back up channels for the group of devices.

9. The source assisted channel management method as in claim 8 wherein said plurality of communicating devices is a pair of source and destination devices.

10. The source assisted channel management method as in claim 8 wherein said plurality of communicating devices is a multicast broadcast group of devices.

11. The source assisted channel management method as in claim 8 wherein when one of the devices in the group detects an incumbent device, the method comprises reporting to all of the devices in the group, including the one device that acts as the controller.

12. The source assisted channel management method as in claim 11 further comprising said one of the devices vacating the channel within a few superframes.

13. The source assisted channel management method as in claim 11 further comprising the source device queuing up said multimedia stream so that no disruption is caused.

14. A channel management method in a distributed spectrum cognitive radio wireless network having a plurality of communicating devices forming a group, without using a separate controller that is referenced in IEEE 802.22 standard, the method comprising:
- configuring at least one source device of multimedia stream data using a current channel to track traffic schedule of said data;
- proactively scanning for back-up channels which could be used in lieu of the current channel;
- identifying certain communicating devices in the network which should vacate a current channel when any one device from the group of communicating devices detects an incumbent, and make a determination as to when the wireless network should vacate the current channel based on said traffic schedule; ensuring that no interference is caused to existing users and QoS is maintained,
- using a signaling window for exchanging network entry messages and channel reservation requests;
- synchronizing the devices to resume transmission in a selected back-up channel after channel switch, retaining for the selected back-up channel unchanged settings/states as used in said current channel;
- wherein within the plurality of communicating devices, one device is configured to act as a controller for all remaining of the plurality of communicating devices;
- wherein said one device is further configured to be aware of transmission, reception and sensing times of all the devices in the plurality of communicating devices;
- wherein said one device is additionally configured to request devices within the group of devices to visit other channels when not busy to know any channel activity and to proactively select back up channels for the group of devices.

* * * * *